US012388549B2

(12) United States Patent
Wang et al.

(10) Patent No.: US 12,388,549 B2
(45) Date of Patent: Aug. 12, 2025

(54) METHOD AND TIME SYNCHRONIZATION (TS) NODE FOR ENABLING EXTENDED HOLDOVER TIME

(71) Applicant: Telefonaktiebolaget LM Ericsson (publ), Stockholm (SE)

(72) Inventors: Jun Wang, Beijing (CN); Yao Peng, Beijing (CN); Guoliang Gao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 375 days.

(21) Appl. No.: 17/923,689

(22) PCT Filed: May 6, 2020

(86) PCT No.: PCT/CN2020/088776
§ 371 (c)(1),
(2) Date: Nov. 7, 2022

(87) PCT Pub. No.: WO2021/223102
PCT Pub. Date: Nov. 11, 2021

(65) Prior Publication Data
US 2023/0179313 A1 Jun. 8, 2023

(51) Int. Cl.
*H04J 3/06* (2006.01)
(52) U.S. Cl.
CPC .......... *H04J 3/0641* (2013.01); *H04J 3/0667* (2013.01)
(58) Field of Classification Search
CPC ............................ H04J 3/0641; H04J 3/0667
See application file for complete search history.

(56) References Cited

U.S. PATENT DOCUMENTS

| 8,446,896 B2 * | 5/2013 | Bedrosian | H04J 3/0697 370/348 |
| 8,537,948 B2 * | 9/2013 | Przada | H04J 3/0688 375/365 |
| 8,644,351 B2 * | 2/2014 | Hamasaki | H04J 3/0688 370/252 |

(Continued)

FOREIGN PATENT DOCUMENTS

| CN | 1716949 A | 1/2006 |
| CN | 102388556 A | 3/2012 |
| CN | 102752843 A | 10/2012 |

OTHER PUBLICATIONS

Author Unknown, "IEEE Standard for a Precision Clock Synchronization Protocol for Networked Measurement and Control Systems," IEEE Instrumentation and Measurement Society, Standard 1588, 2008, 289 pages.

(Continued)

*Primary Examiner* — Bailor C Hsu
(74) *Attorney, Agent, or Firm* — Weisberg I.P. Law, P.A.

(57) ABSTRACT

The present disclosure provides a method and time synchronization node for enabling extended holdover time. The method comprises: detecting whether the TS node loses time synchronization with its master TS node or not; and transmitting a first announce message comprising a first indicator to one or more slave TS nodes in response to detecting that the TS node loses the time synchronization with its master TS node, wherein the first indicator indicates a holdover time budget for enabling extended holdover time at the one or more slave TS nodes.

15 Claims, 10 Drawing Sheets

(56) References Cited

U.S. PATENT DOCUMENTS

| | | | |
|---|---|---|---|
| 8,666,009 B2* | 3/2014 | Lim | H04J 3/0641 |
| | | | 375/357 |
| 8,674,778 B2* | 3/2014 | Nicholls | H03L 7/093 |
| | | | 331/158 |
| 8,976,778 B2* | 3/2015 | Bedrosian | H04J 3/0667 |
| | | | 370/348 |
| 9,749,972 B2* | 8/2017 | Bin Sediq | H04W 56/001 |
| 11,191,053 B1* | 11/2021 | Ouellette | H04W 56/007 |
| 11,343,846 B2* | 5/2022 | Reddy | H04W 36/0064 |
| 11,816,051 B1* | 11/2023 | Kenney | G06F 13/4282 |
| 2014/0023369 A1 | 1/2014 | Zheng | |
| 2015/0326332 A1* | 11/2015 | Chen | H04J 3/0658 |
| | | | 370/503 |
| 2018/0262287 A1* | 9/2018 | Han | H04J 3/0641 |
| 2021/0175991 A1* | 6/2021 | Neugeboren | H04J 3/0667 |

OTHER PUBLICATIONS

Author Unknown, "Precision time protocol telecom profile for phase/time synchronization with full timing support from the network," Standard Recommendation G.8275/Y.13691, Telecommunication Standardization Sector of ITU, Jun. 2016, 56 pages.

Author Unknown, "Precision time protocol telecom profile for phase/time synchronization with partial timing support from the network," Standard Recommendation G.8275.2/Y.1369.2, Telecommunication Standardization Sector of ITU, Jun. 2016, 46 pages.

International Search Report and Written Opinion for International Patent Application No. PCT/CN2020/088776, mailed Jan. 26, 2021, 9 pages.

* cited by examiner

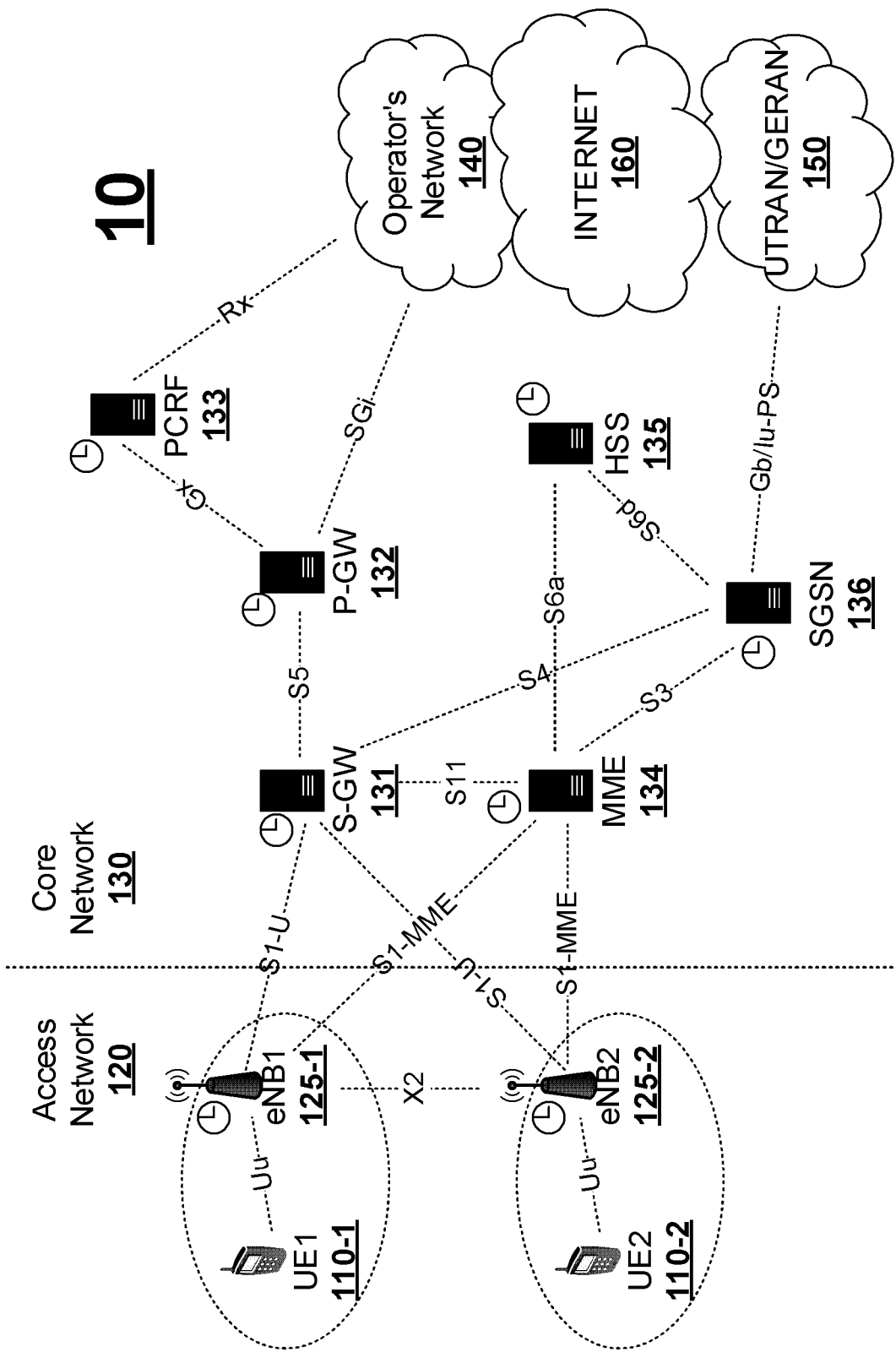

METHOD AND TIME SYNCHRONIZATION (TS) NODE FOR ENABLING EXTENDED HOLDOVER TIME

This application is a 35 U.S.C. § 371 national phase filing of International Application No. PCT/CN2020/088776, filed May 6, 2020, the disclosure of which is incorporated herein by reference in its entirety.

TECHNICAL FIELD

The present disclosure is related to the field of telecommunication, and in particular, to a method and time synchronization (TS) node for enabling extended holdover time.

BACKGROUND

In modern computer networks, for example, telecommunication networks, time synchronization is critical because every aspect of operating, managing, securing, planning, and debugging a network involves determining when events happened and/or when events will or should happen. For example, an eNodeB (eNB) in a Long Term Evolution (LTE) network has to be synchronized and cooperated with other eNBs nearby to function properly. Otherwise significant interferences to the eNB will be caused by asynchronous transmissions from the other eNBs, and vice versa.

One of the protocols for synchronization is the Precision Time Protocol (PTP), also known as Institute of Electrical and Electronics Engineers (IEEE) 1588, which is designed to synchronize clocks at nodes in a network to sub-microsecond precision, making it suitable for measurement and control systems. PTP is currently employed to synchronize financial transactions, mobile phone tower transmissions, sub-sea acoustic arrays, and networks that require precise timing.

The original version of PTP, IEEE 1588-2002, was published in 2002. IEEE 1588-2008, also known as PTP Version 2 is not backward compatible with the original 2002 version. IEEE 1588-2019 was published in November 2019 and includes backward-compatible improvements to the 2008 publication. IEEE 1588-2008 (or PTP Version 2) is an industry-standard protocol that enables the precise transfer of phase and time to synchronize clocks over packet-based Ethernet networks. It synchronizes the local slave clock on each network device with a system Grandmaster clock and uses traffic time-stamping, with sub-nanoseconds granularity, to deliver the very high accuracy of synchronization needed to ensure the stability of base station frequency and handovers. Timestamps between master and slave devices are sent within specific PTP packets and in its basis form the protocol is administration-free.

IEEE 1588-2008 includes a profile concept defining PTP operating parameters and options. Several profiles have been defined for applications including telecommunications, electric power distribution, and audiovisual. One of the profiles adopted by current telecommunication industry is the Telecommunication Standardization Sector of International Telecommunication Union (ITU-T) G.8275.1/Y.1369.1. The ITU-T G.8275.1 profile defines a specific architecture to allow the distribution of phase/time with full timing support network.

However, there are still many unsolved problems in existing time synchronization mechanisms. For example, how to extend holdover time at a TS node while it still has the capability to do so is one of them.

SUMMARY

According to an aspect of the present disclosure, a method at a time synchronization (TS) node for enabling extended holdover time is provided. The method comprises: detecting whether the TS node loses time synchronization with its master TS node or not; and transmitting a first announce message comprising a first indicator to one or more slave TS nodes in response to detecting that the TS node loses the time synchronization with its master TS node, wherein the first indicator indicates a holdover time budget for enabling extended holdover time at the one or more slave TS nodes.

In some embodiments, after an initial transmission of the first announce message, one or more further transmissions of the first announce message occur periodically with a value of the holdover time budget comprised in the first announce message being gradually reduced as the time elapses. In some embodiments, the method further comprises: entering into a "Holdover-In-Specification" state upon detecting that the TS node loses the time synchronization with its master TS node. In some embodiments, the first announce message further comprises a second indicator indicating that the TS node enters into the "Holdover-In-Specification" state. In some embodiments, the first indicator indicates an initial holdover time budget which is pre-configured at the TS node. In some embodiments, upon detecting that the TS node loses the time synchronization with its master TS node, the method further comprises: starting a holdover timer with its expiration time set as the initial holdover time budget.

In some embodiments, before detecting that the TS node loses the time synchronization with its master TS node, the method further comprises: receiving a second announce message which comprises a third indicator, the third indicator indicating a holdover time budget of the master TS node when the second announce message was transmitted; and storing the holdover time budget of the master TS node. In some embodiments, the first indicator indicates the minimum of an initial holdover time budget which is pre-configured at the TS node and the stored holdover time budget of the master TS node if the master TS node belongs to a same TS region as that of the TS node. In some embodiments, upon detecting that the TS node loses the time synchronization with its master TS node, the method further comprises: starting a holdover timer with its expiration time set as the minimum of the initial holdover time budget which is pre-configured at the TS node and the stored holdover time budget of the master TS node.

In some embodiments, the first indicator indicates the sum of an initial holdover time budget which is pre-configured at the TS node and the stored holdover time budget of the master TS node if the master TS node belongs to a TS region other than that of the TS node. In some embodiments, upon detecting that the TS node loses the time synchronization with its master TS node, the method further comprises: starting a holdover timer with its expiration time set as the sum of the initial holdover time budget which is pre-configured at the TS node and the stored holdover time budget of the master TS node.

In some embodiments, the method further comprises: placing the TS node into a "Holdover-Out-Of-Specification" state upon the expiration of the holdover timer. In some embodiments, if multiple second announce messages are received from the master TS node, the step of storing the holdover time budget of the master TS node comprises: overwriting the previously stored holdover time budget of the master TS node with the holdover time budget of the master TS node indicated in the last received second announce message.

In some embodiments, in response to detecting that time synchronization with the master TS node which is synchronized to a primary reference time source (PRTS) or in the "Holdover-In-Specification" state is restored, the method further comprises: placing the TS node into the "locked" state; stopping the holdover timer; and transmitting an announce message to the one or more slave TS nodes to inform the restoration of the time synchronization.

In some embodiments, in response to detecting that time synchronization with the master TS node which is synchronized to a primary reference time source (PRTS) is restored, the method further comprises: clearing the stored holdover time budget of the master TS node. In some embodiments, in response to detecting that time synchronization with the master TS node which is in the "Holdover-In-Specification" state is restored, the method further comprises: updating the holdover time budget of the master TS node when receiving the second announce message.

In some embodiments, each of the TS nodes is an IEEE 1588 Precision Time Protocol (PTP)-compliant node. In some embodiments, each of the announce messages is a PTP-compliant ANNOUNCE message.

According to another aspect of the present disclosure, a time synchronization (TS) node is provided. The TS node comprises: a processor; a memory storing instructions which, when executed by the processor, cause the processor to perform any method described above.

According to yet another aspect of the present disclosure, a non-transitory computer readable storage medium is provided. The non-transitory computer readable storage medium stores instructions which, when executed by a processor, cause the processor to perform any method described above.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 1 is a diagram illustrating a telecommunication network comprising various functional entities in which an embodiment of the present disclosure may be applicable.

DETAILED DESCRIPTION

Figure 2A:
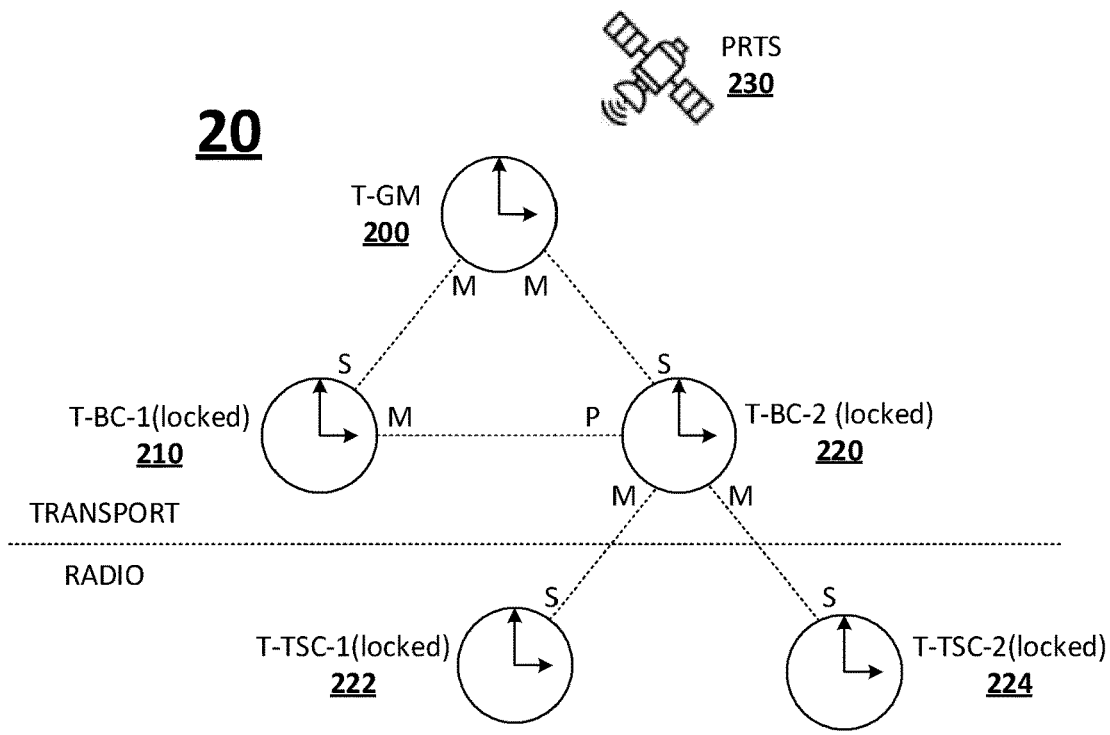
FIG. 2A-FIG. 2C are schematic diagrams illustrating a TS network comprising multiple TS nodes according to an embodiment of the present disclosure.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of Long Term Evolution (LTE), the present disclosure is not limited thereto. In fact, as long as time synchronization is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 5th Generation New Radio (5G NR), etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, a wireless device, a wireless terminal, or any other equivalents. For another example, the term "eNodeB" or "eNB" used herein may refer to a base station, a base transceiver station, an access point, a hot spot, a NodeB, an Evolved NodeB, a gNB, a network element, or any other equivalents. Further, the term "node" used herein may refer to a UE, a functional entity, a network entity, a network element, a network equipment, a TS node, or any other equivalents.

Further, although the embodiments described below are given in the context of PTP protocol and ITU-T G.8275.1 profile, the present disclosure is not limited thereto. In fact, the embodiments of the present disclosure may be applicable to any protocol and/or profile for time synchronization with appropriate modifications, adjustments, and/or changes which are known to one skilled in the art, if necessary.

Before the description of the embodiments of the present disclosure is given in details, some definitions of the terms will be explained below to facilitate the understanding of the present disclosure.

Node or TS node: A device that can issue or receive communications for time synchronization on a network.

Clock: A node participating in a time synchronization process, such as Precision Time Protocol (PTP), that is capable of providing a measurement of the passage of time since a defined epoch.

Domain: A logical grouping of clocks that synchronize to each other using the time synchronization process, but that are not necessarily synchronized to clocks in another domain.

Region: A logical part of a domain which comprises no node from any other region in the domain.

Primary reference time source: A source of time that is traceable to international standards, such as Global Positioning System (GPS).

Master clock: In the context of a single communication path for time synchronization, a clock that is the source of time to which all other clocks on that path synchronize.

Slave clock: A clock that is synchronized to a master clock.

Grandmaster clock: Within a domain, a clock that is the ultimate source of time for clock synchronization using the time synchronization process.

Port: A logical access point of a clock for time synchronization communications to the communications network.

Master port: A port of a master clock via which a slave clock is synchronized or locked to the master clock Slave port: A port of a slave clock via which the slave clock is synchronized or locked to its master clock.

Passive port: A port of a clock which does not place any messages on its communication path except for Pdelay_Req, Pdelay_Resp, Pdelay_Resp_Follow_Up, or signaling messages, or management messages that are required responses to another management message.

Holdover: A clock previously synchronized to another clock (normally a primary reference or a master clock) but now free-running based on its own internal oscillator, whose frequency is being adjusted using data acquired while it had been synchronized to the other clock. It is said to be in holdover or in the holdover state, as long as it is within its accuracy requirements.

Ordinary clock: A clock that has a single port in a domain and maintains the timescale used in the domain. It may serve as a source of time, i.e., be a master clock, or may synchronize to another clock, i.e., be a slave clock.

Boundary clock: A clock that has multiple ports in a domain and maintains the timescale used in the domain. It may serve as the source of time, i.e., be a master clock, and may synchronize to another clock, i.e., be a slave clock.

FIG. 1 is a diagram illustrating a telecommunication network 10 comprising various functional entities or nodes in which an embodiment of the present disclosure may be applicable. Please note that although FIG. 1 shows an exemplary telecommunication network 10 based on the 4G LTE technology, the present disclosure is not limited thereto as mentioned above.

As shown in FIG. 1, the telecommunication network 10 may comprise an access network 120 and a core network 130 as defined in 4G LTE. The access network 120 may comprise one or more eNodeBs (eNBs) (e.g., the eNB1 125-1 and eNB2 125-2) for providing user equipments (UE) (e.g., UE1 110-1 and UE2 110-2) with access to the core network 130 and finally to the Internet 160.

Further, the core network 130 may comprise a Serving-Gateway (S-GW) 131, a Packet Data Network (PDN) gateway (P-GW) 132, a Policy & Charging Rules Function (PCRF) 133, a Mobility Management Entity (MME) 134, a Home Subscriber Server (HSS) 135, and a Serving GPRS Support Node (SGSN) 136, among other functional entities. All these nodes should be synchronized to each other, or the performance of the telecommunication network 10 will be seriously degraded.

For example, if the eNB1 125-1 is not synchronized to the eNB 2 125-2 directly via the X2 interface therebetween or via any other interface (e.g. S1-U interfaces between the eNBs 125-1/125-2 and the S-GW 131) indirectly, then wireless transmission from the eNB2 125-2 to the UE2 110-2 may cause a significant interference to the transmission from the eNB1 125-1 to the UE1 110-1, and vice versa. For another example, if the S-GW 131 is not synchronized to the MME 134 via the S11 interface directly or via any other interface indirectly, then user plane data destined to the UE1 110-1 may be incorrectly routed to the eNB1 125-1 instead of eNB2 125-2 when a handover of the UE1 110-1 from the cell served by eNB1 125-1 to the cell served by the eNB2 125-2 is approved by the MME 134 while the S-GW 131 is not notified of such a handover due to the asynchronous operations between the S-GW 131 and the MME 134. Based on these examples, it is obvious that it is very important to maintain the nodes in the telecommunication network 10 to be synchronized to each other.

Next, a time synchronization mechanism based on PTP/ITU-T G.8275.1 will be explained with reference to FIG. 2A-FIG. 2C.

Figure 2B:
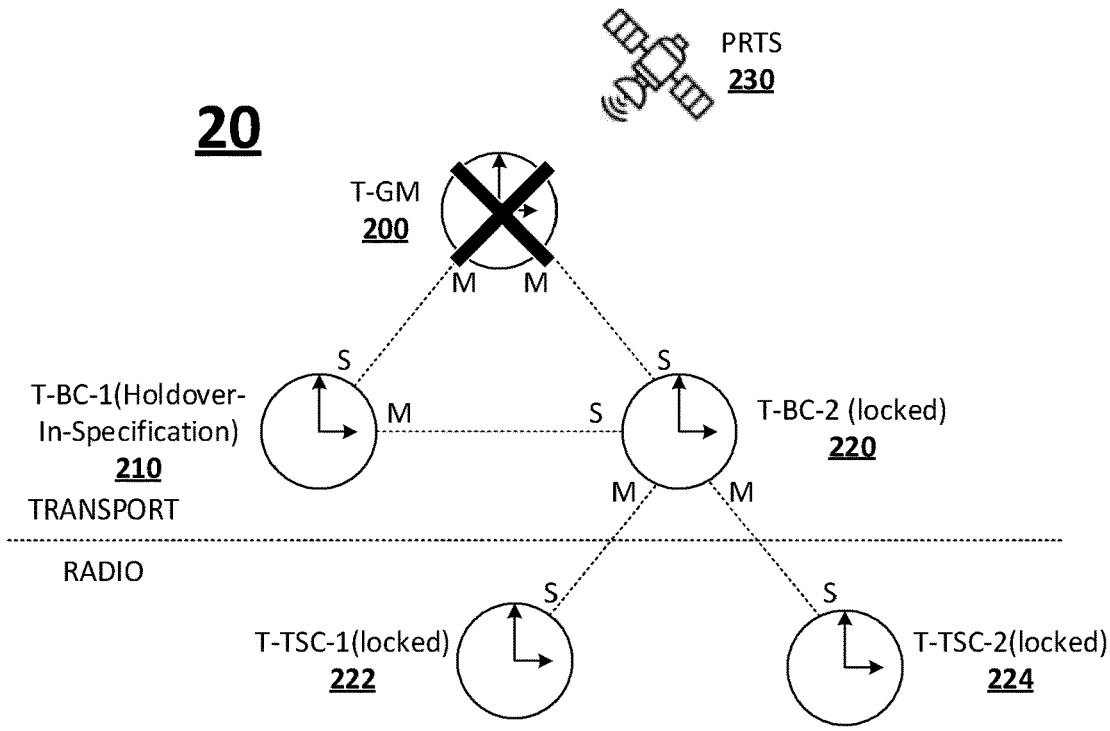
Figure 2C:
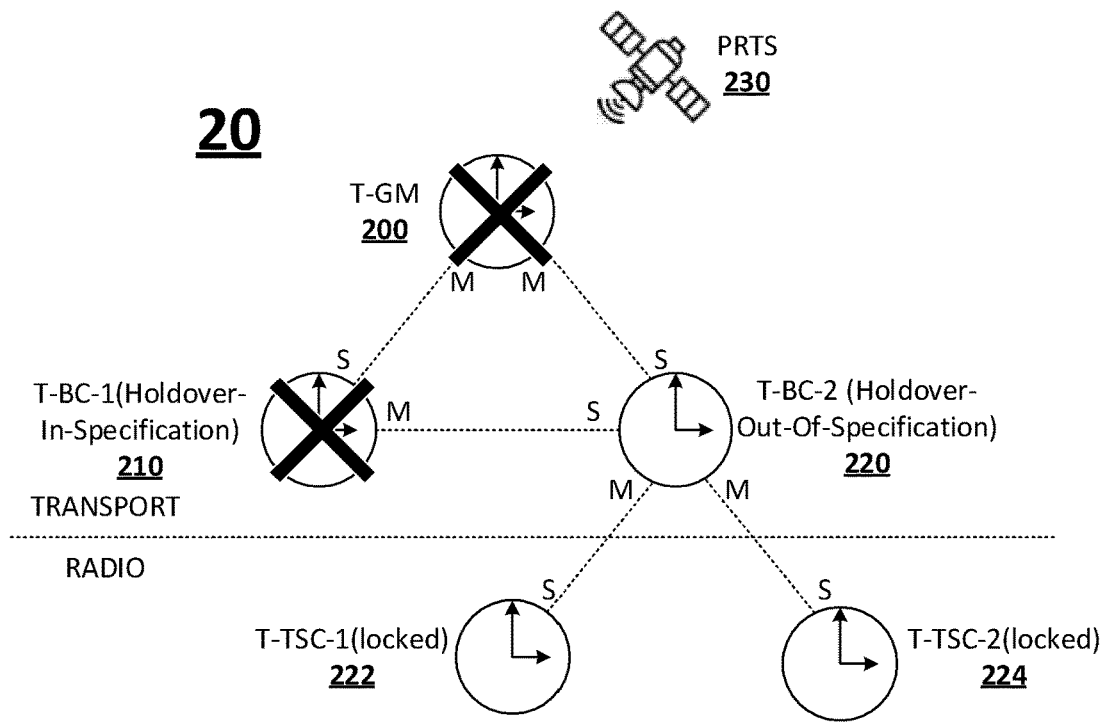

FIG. 2A-FIG. 2C are schematic diagrams illustrating a TS network (or domain) 20 comprising multiple TS nodes according to an embodiment of the present disclosure. As shown in FIG. 2A-FIG. 2C, the TS network 20 may comprise one or more TS nodes, such as, a grand master clock (e.g. T-GM 200), two boundary clocks (e.g. T-BC-1 210 and T-BC-2 220), and two slave-only ordinary clocks (e.g. T-TSC-1 222 and T-TSC-2 224), which are synchronized to each other. Further, there is also a primary reference time source (PRTS) 230 to which the T-GM 200 (and the whole TS network 20) is synchronized, and it typically does not belong to the TS domain 20 according to the definition of "domain" above.

As shown in FIG. 2A-FIG. 2C, these nodes 200, 210, 220, 222, and 224 in the TS domain 20 may be divided into two regions, a transport region and a radio region. In some embodiments, each of the nodes 200, 210, and 220 in the transport region may be the nodes in the core network 130, such as S-GW 131, MME 134, P-GW 132, etc., as shown in FIG. 1, while the nodes in the radio region may be the nodes in the access network 120, such as eNB1 125-1, eNB2 125-2, also as shown in FIG. 1. Further, in the embodiment shown in FIG. 2A, the T-TSC-1 222 and T-TSC-2 224 are slave clocks synchronized to the T-BC-2 220, as indicated by the reference symbols "S" (for slave port) and "M" (for master port). Further, the T-BC-1 210 and T-BC-2 220 are slave clocks synchronized to the T-GM 200. Therefore, the T-TSC-1 222 and T-TSC-2 224 are also slave clocks synchronized to the T-GM 200. Furthermore, the T-BC-1 210 may also have an additional master port which may communicate with a passive port of the T-BC-2 220 to exchange data for time synchronization, as shown in FIG. 2A, which will be explained later.

Please note that although FIG. 2A-FIG. 2C show only certain nodes and certain links between those nodes, the present disclosure is not limited thereto, and there may be additional nodes, less nodes, different nodes, and/or additional links, less links or different links therebetween. For example, a link may be present between T-BC-1 210 and T-TSC-1 222 though it is not shown in FIG. 2A-FIG. 2C. For another example, an additional node such as a transparent clock T-TC may be present between the T-GM 200 and the T-BC-2 220. However, please note that, according to the provisions of subclause 6.7.1 of IEEE 1588-2008, "In all other cases, PTP assumes that the underlying bridging or routing protocols ensure that PTP message forwarding avoids loops." Therefore, no loop is present in the embodiments described herein. However, the present disclosure is not limited thereto.

Referring to FIG. 2A, the TS domain 20 is operated in a locked state. In other words, each node of the TS domain 20 is synchronized or locked to its master node, and ultimately to the grand master node T-GM 200, which is synchronized or locked to its master node PRTS 230, which could be an GPS satellite in the embodiment shown in FIG. 2A.

As mentioned in the Background section, a TS node may temporarily lose its time synchronization with its master node. As shown in FIG. 2B, the nodes in the TS domain 20 other than the T-GM 200 lose their time synchronization with the grand master node T-GM 200, for example, due to the power-down or link failure of the T-GM 200. In such a case, the boundary clock node T-BC-1 210 may become the new grand master clock, for example, based on the best master clock algorithm specified in PTP and ITU-T G.8275.1, and enters into the "Holdover-In-Specification" state, which indicates that it is in the holdover state and the time error at its output is still within the holdover specification. The T-BC-1 210 may then transmit an announce message (e.g., a PTP ANNOUNCE message) to inform other nodes of its "Holdover-In-Specification" state (e.g., by setting clockClass=135 in the announce message, as defined in Table 3 below). Upon receiving the announce message, other nodes, such as T-BC-2 220, T-TSC-1 222, and T-TSC-2 224 will be synchronized to the T-BC-1 210 and aware of its Holdover-In-Specification state. Therefore, the nodes in the TS domain 20 can still be operated with an acceptable synchronization error as long as the T-BC-1 210 stays in the Holdover-In-Specification state. In this way, even if the original grand master clock T-GM 200 is down, all other nodes in the TS domain 20 may be operated normally for a certain period of time, and if the T-GM 200 may come back online before the expiration of this period of time, then all the nodes may be synchronized to the T-GM 200 again and be operated normally.

However, if the T-GM 200 cannot be restored during the Holdover-In-Specification period of T-BC-1 210, when a holdover budget at the T-BC-1 210 is exhausted, or when the drifting error of the T-BC-1 210 goes beyond the acceptable limit, T-BC-1 210 may enter into the "Holdover-Out-Of-Specification" state, which indicates an unacceptable error level of its clock output, and may inform other nodes of its "Holdover-Out-Of-Specification" state via another announce message (e.g., by setting clockClass=165 in this announce message, as defined in Table 3 below).

Further, as shown in FIG. 2C, during the time period in which the T-GM 200 is down and the T-BC-1 210 is in the Holdover-In-Specification state, the T-BC-2 220 and its slave TS nodes T-TSC-1 222 and T-TSC-2 224 may also lose their time synchronization with the T-BC-1 210, for example, due to the power down of the T-BC-1 210 or the failure of the communication link between the T-BC-1 210 and the T-BC-2 220. Since there is no way for the T-BC-2 220 to aware of to what extent the holdover budget at the T-BC-1 210 is used or whether the holdover budget is exhausted or not, then the T-BC-2 220 has to enter into the Holdover-Out-Of-Specification state immediately and directly although the performance of the clock output at the T-BC-2 220 may still be acceptable.

In other words, although the overall performance of the nodes of the TS domain 20 may be still acceptable, these nodes will consider themselves cannot provide acceptable services, resulting in a higher probability of service down and waste of resources.

To improve the embodiment of FIG. 2A-FIG. 2C, another embodiment will be described with reference to FIG. 3A-FIG. 3G, in which a new HoldoverBudget TLV (Tag-Length-Value) of the announce message is proposed to enable extended holdover time at nodes in a TS domain.

An exemplary announce message or an exemplary PTP ANNOUNCE message is defined in Table 1 below.

TABLE 1

Announce message fields

| Bits | | | | | | | | Octets | Offset |
|---|---|---|---|---|---|---|---|---|---|
| 7 | 6 | 5 | 4 | 3 | 2 | 1 | 0 | | |
| header | | | | | | | | 34 | 0 |
| originTimestamp | | | | | | | | 10 | 34 |
| currentUtcOffset | | | | | | | | 2 | 44 |
| reserved | | | | | | | | 1 | 46 |
| grandmasterPriority1 | | | | | | | | 1 | 47 |
| grandmasterClockQuality | | | | | | | | 4 | 48 |
| grandmasterPriority2 | | | | | | | | 1 | 52 |
| grandmasterIdentity | | | | | | | | 8 | 53 |
| stepsRemoved | | | | | | | | 2 | 61 |
| timeSource | | | | | | | | 1 | 63 | header: It is defined in subclause 13.3.1 of IEEE 1588-2008.
originTimestamp (Timestamp): The value of originTimestamp shall be 0 or an estimate no worse than ±1 s of the local time of the originating clock when the Announce message was transmitted.
currentUtcOffset (Integer16): The value of currentUtcOffset shall be the value of the timePropertiesDS.currentUtcOffset member of the data set.
grandmasterPriority1 (UInteger8): The value of grandmasterPriority1 shall be the value of the parentDS.grandmasterPriority1 member of the data set.
grandmasterClockQuality (ClockQuality): The value of grandmasterClockQuality shall be the value of the parentDS.grandmasterClockQuality member of the data set.
grandmasterPriority2 (UInteger8): The value of grandmasterPriority2 shall be the value of the parentDS.grandmasterPriority2 member of the data set.
grandmasterIdentity (ClockIdentity): The value of grandmasterIdentity shall be the value of the parentDS.grandmasterIdentity member of the data set.
stepsRemoved (UInteger16): The value of stepsRemoved shall be the value of currentDS.stepsRemoved of the data set of the clock issuing this message.
timeSource (Enumeration8): The value of timeSource shall be the value of the timePropertiesDS.timeSource member of the data set.

Further, the HoldoverBudget TLV mentioned above may be a suffix appended to the announce message, and it may be defined in Table 2 below.

TABLE 2

HoldoverBudget TLV fields

| Bits | | | | | | | | Octets | Offset |
|---|---|---|---|---|---|---|---|---|---|
| 7 | 6 | 5 | 4 | 3 | 2 | 1 | 0 | | |
| tlvType | | | | | | | | 2 | 0 |
| lengthField | | | | | | | | 2 | 2 |
| clockIdentity | | | | | | | | 8 | 4 |
| holdoverBudget | | | | | | | | 4 | 12 | tlvType (UInteger16): The value of tlvType shall be HOLDOVER_BUDGET, the value may be 4001.
lengthField (UInteger16): The value of lengthField is 12.
clockIdentity (ClockIdentity): The value of clockIdentity indicates a clock which is in the Holdover-In-Specification state.
holdoverBudget (UInteger32): The value of holdoverBudget shall be the current budget at the clock for staying in the Holdover-In-Specification state.

Further, an exemplary mapping between clockClass and states of TS node is given in Table 3 below.

TABLE 3

| Applicable clockClass values | |
|---|---|
| Phase/time traceability description | clockClass |
| T-GM connected to a PRTC in locked mode | 6 |
| T-GM in holdover, within holdover specification | 7 |
| T-BC in holdover, within holdover specification | 135 |
| T-GM in holdover, out of holdover specification | 140, 150, or 160, depending on a frequency source to which T-GM is traceable. |
| T-BC in holdover, out of holdover specification | 165 |

By using this announce message with the HoldoverBudget TLV, a TS node may inform its slave TS nodes of its remaining budget for Holdover-In-Specification state, and each of the slave TS nodes may exploit this information for extending its own Holdover-In-Specification state if it loses time synchronization with its master node. In other words, with the knowledge of the remaining holdover budget, a TS node may not enter the Holdover-Out-Of-Specification state immediately and directly as shown in FIG. 2C, and may continue the Holdover-In-Specification state instead, which obviously improves the robustness of the whole system against the temporary loss of time synchronization.

To explain this holdover extension capability, an exemplary embodiment will be described in details with reference to FIG. 3A-FIG. 3G below.

FIG. 3A-FIG. 3G are schematic diagrams illustrating a TS network 30 comprising multiple TS nodes according to another embodiment of the present disclosure.

Figure 3A:
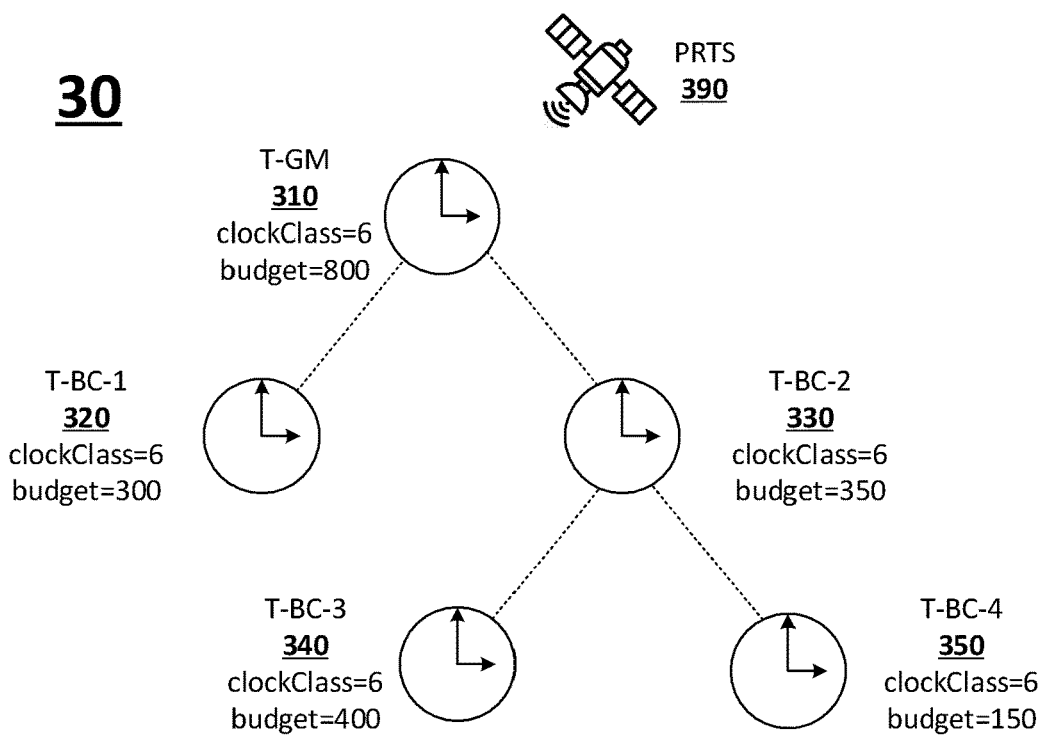
FIG. 3A-FIG. 3G are schematic diagrams illustrating another TS network comprising multiple TS nodes according to another embodiment of the present disclosure.

Referring to FIG. 3A, the TS network or domain 30 may comprise multiple TS nodes, such as, a grand master clock (e.g. T-GM 310), four boundary clocks, T-BC-1 320, T-BC-2 330, T-BC-3 340, and T-BC-4 350, which are synchronized to each other. Further, there is also a primary reference time source (PRTS) 390 to which the T-GM 310 (and the whole TS network 30) is synchronized, and it typically does not belong to the TS domain 30 according to the definition of "domain" above.

As shown in FIG. 3A, there is only one region comprising all the TS nodes of the TS domain 30, or there is no region at all, depending on how the region is defined. By contrast, a multiple region scenario will be described with reference to FIG. 4A-FIG. 4F later. Further, the master/slave ports are not shown in FIG. 3A-FIG. 3G for simplicity, and one skilled in the art may readily understand that a TS node may be a slave TS node synchronized to an upper master TS node which is connected by a dotted line therebetween, and also is a master TS node synchronized to a lower slave TS node which is connected by a dotted line therebetween. Further, the T-GM 310 is synchronized to the PRTS 390, which is the master TS node for the T-GM 310.

Please note that although FIG. 3A-FIG. 3G show only certain nodes and certain links between those nodes, the present disclosure is not limited thereto, and there may be additional nodes, less nodes, different nodes, and/or additional links, less links or different links therebetween. For example, a link may be present between T-BC-1 320 and T-BC-3 340 though it is not shown in FIG. 3A-FIG. 3G. For another example, an additional node such as a transparent clock T-TC may be present between the T-GM 310 and the T-BC-2 330.

Referring back to FIG. 3A, the TS domain 30 is operated in a locked state. In other words, each node of the TS domain 30 is synchronized or locked to its master node, and ultimately to the grand master node T-GM 310, which is synchronized or locked to its master node PRTS 390, which could be a GPS satellite in the embodiment shown in FIG. 3A. Since all the nodes are locked to the T-GM 310 directly or indirectly, their clockClass will be identical to that of the grand master clock T-GM 310, which is 6 in the embodiment of FIG. 3A and according to the Table 3 above.

Further, each TS node in the domain 30 will be pre-configured or assigned an initial holdover budget, for example, based on their own hardware capabilities (e.g. clock accuracy, oscillator level). As shown in FIG. 3A, the T-GM 310, T-BC-1 320, T-BC-2 330, T-BC-3 340, T-BC-4 350 are pre-configured with holdover budgets of 800 ns, 300 ns, 350 ns, 400 ns, and 150 ns, respectively.

Figure 3B:
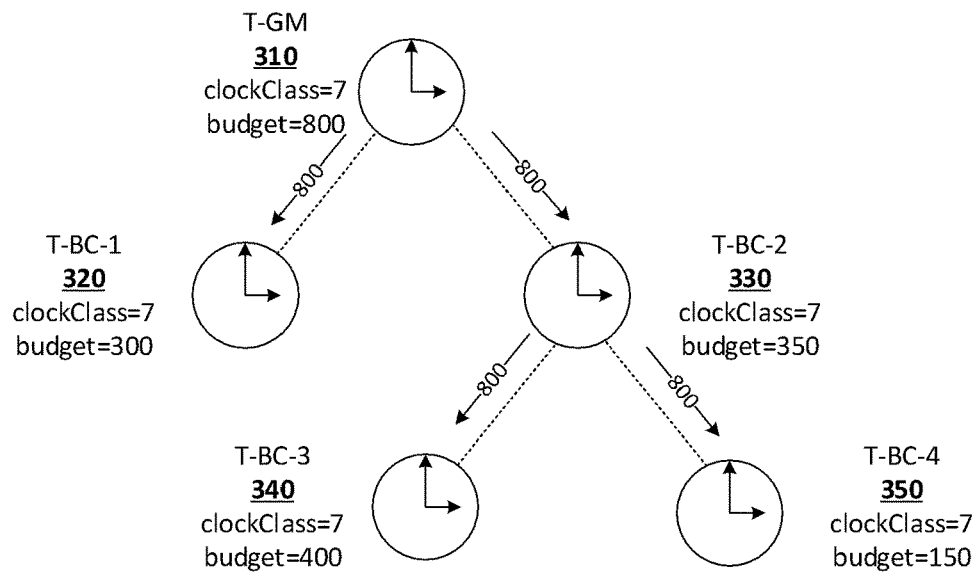

Referring to FIG. 3B, the T-GM 310 may lose its time synchronization with its master node PRTS 390, and it changes its state from the "locked" state to the "Holdover-In-Specification" state by setting its clockClass to 7 and starting a holdover timer with its expiration time set as its initial holdover budget of 800 ns. Further, the T-GM 310 may transmit an announce message with the HoldoverBudget TLV to its slave TS nodes to inform them of the change of state and the remaining HoldoverBudget. In such a case, the remaining holdover budget is 800 ns, which will be appended to the announce message as shown in FIG. 3B. Upon receiving the announce message with the holdover budget of 800 ns, each of the TS nodes, T-BC-1 320, T-BC-2 330, T-BC-3 340, and T-BC-4 350, will change their own clockClass to 7, and store the received holdover budget of 800 ns for future use.

Figure 3C:
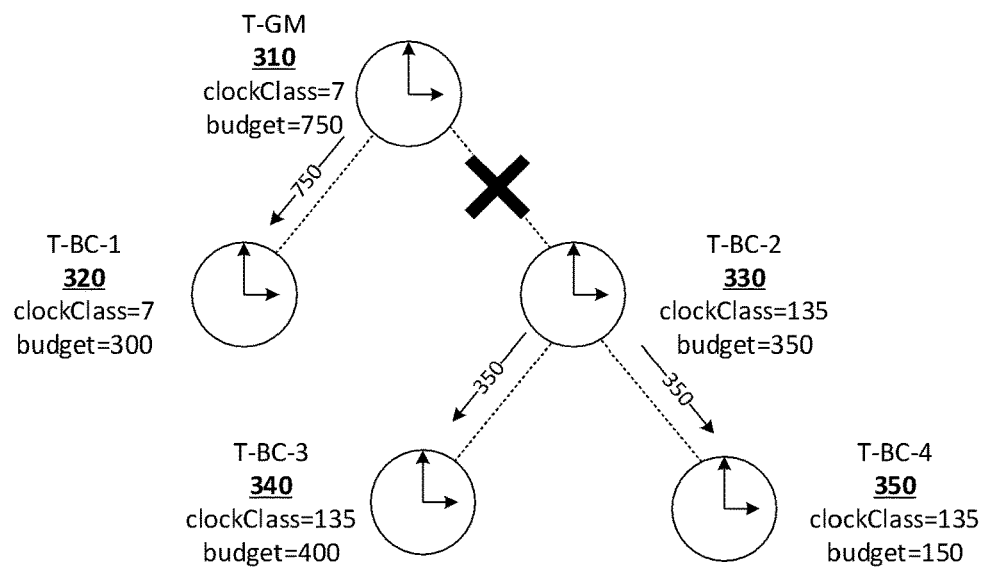

Referring to FIG. 3C, the T-BC-2 330 may detect loss of time synchronization with its master TS node, T-GM 310 (e.g. due to link failure between the T-GM 310 and the T-BC-2 330), and it may first determine whether its own state is "Holdover-In-Specification" state or not, for example, by checking its own clockClass. Since the clockClass at T-BC-2 330 was 7 which indicates a Holdover-In-Specification state of its master TS node, T-GM 310, the T-BC-2 330 may change its clockClass from 7 to 135 to indicate it is still in the "Holdover-In-Specification" state but not a grand master clock in the domain 30. After that, the T-BC-2 330 may compare its previously received holdover budget of 800 ns and its pre-configured initial budget of 350 ns, and choose the minimum of those two budgets, i.e. 350 ns, as the expiration time for its own holdover timer to be started. Similar to FIG. 3B, T-BC-2 330 may transmit an announce message with a HoldoverBudget of 350 ns to inform its slave TS nodes of the remaining budget for the part of the TS domain 30, which comprises the T-BC-2 330, T-BC-3 340, and T-BC-4 350. Upon receiving the announce message from T-BC-2 330, the T-BC-3 340 and T-BC-4 350 may update its stored budgets of 800 ns which was previously received, as shown in FIG. 3B, with the new budget of 350 ns as shown in FIG. 3C. On the other hand, the T-BC-1 320 is still synchronized to the T-GM 310, and it receives another transmission of the announce message with a different budget of 750 ns as the time elapses. In other words, the T-GM 310 may transmit its remaining holdover budget to its slave TS nodes periodically, thereby updating its slave TS nodes with the latest remaining budget for the "Holdover-In-Specification" state. In such a case, T-BC-1 320 may update its previously stored budget of 800 ns with the newly received budget of 750 ns as shown in FIG. 3C.

Figure 3D:
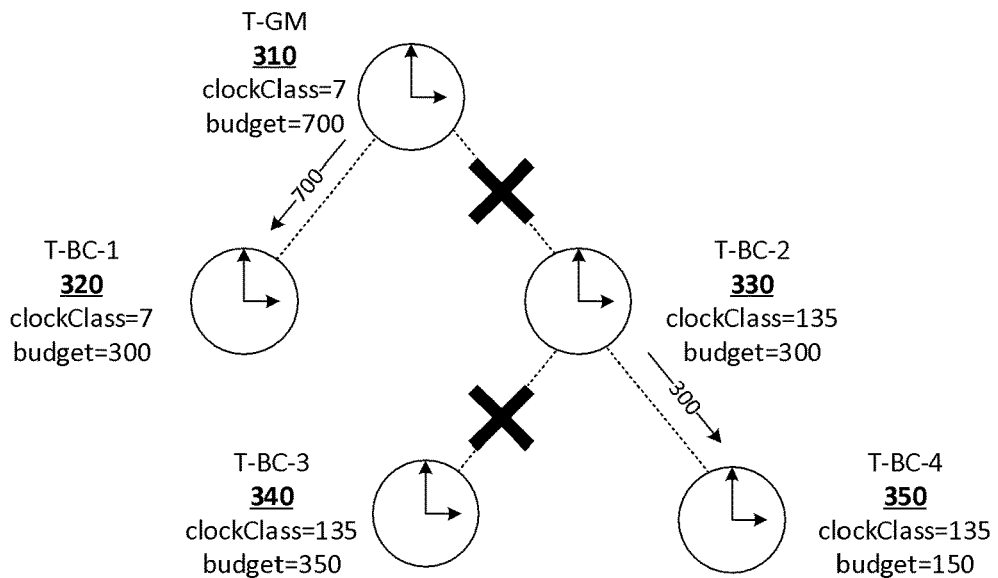

Referring to FIG. 3D, the T-BC-3 340 may detect loss of time synchronization with its master TS node, T-BC-2 330, and it may first determine whether its own state is "Holdover-In-Specification" state or not, for example, by checking its own clockClass. Since the clockClass at T-BC-3 340 was 135 which indicates a Holdover-In-Specification state of its master TS node, T-BC-2 330, the T-BC-3 340 may not change its clockClass since it is not the grand master clock in the domain 30 either. Further, the T-BC-3 340 may compare its previously received holdover budget of 350 ns and its pre-configured initial budget of 400 ns, and choose the minimum of those two budgets, i.e. 350 ns, as the expiration time for its own holdover timer to be started. Similar to T-BC-2 330 in FIG. 3C, T-BC-3 340 may transmit an announce message with a HoldoverBudget of 350 ns to inform its slave TS nodes of the remaining budget for the part of the TS domain 30 comprising the T-BC-3 340. Since no other TS node in this part of the TS domain 30 is shown in FIG. 3D, then the announce message is not shown either. On the other hand, the T-BC-1 320 is still synchronized to the T-GM 310, and the T-BC-4 350 is still synchronized to the T-BC-2 330. Therefore, they will update their stored budgets with the budgets of 700 ns and 300 ns which are received from T-GM 310 and T-BC-2 330, respectively, as shown in FIG. 3D.

Figure 3E:
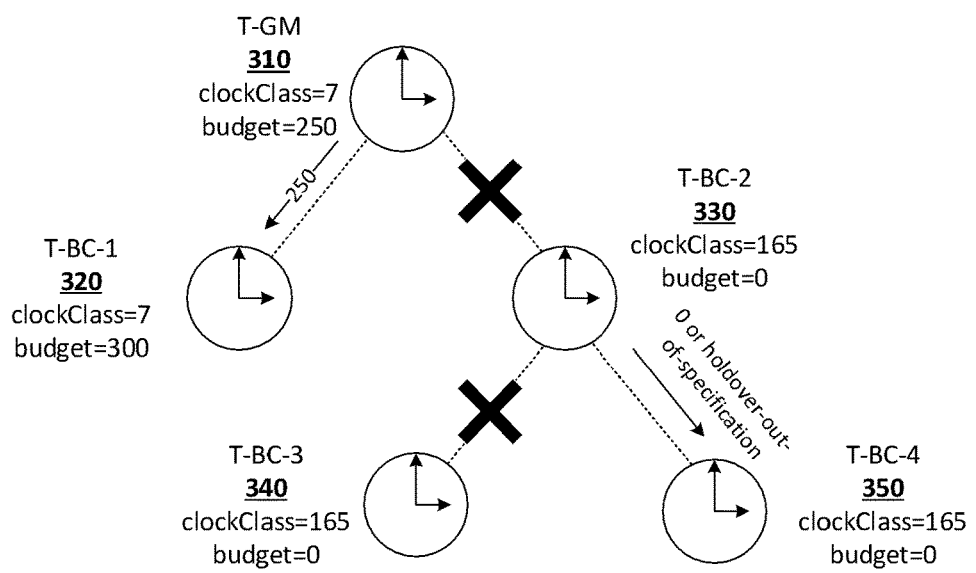

Referring to FIG. 3E, a relatively long period of time elapses, for example, 450 ns from the time instance shown in FIG. 3D. At this time, T-GM 310 is still in the Holdover-In-Specification state due to its great holdover budget, and it will update the T-BC-1 320 with its remaining budget of 250 ns by sending an announce message with a budget of 250 ns. On the other hand, the T-BC-1 320 is still in the locked state and therefore its own initial budget is never used to be compared with the store budget which is received from the T-GM 310.

Further, the T-BC-2 330, T-BC-3 340, and T-BC-4 350 use up their own holdover budgets, and have to change their states to the "Holdover-Out-Of-Specification" state as shown in FIG. 3E. Since the T-BC-4 350 is still locked to the T-BC-2 330 and its own holdover timer was not started, its changing of state may be triggered by receiving an announce message from its master TS node T-BC-2 330, in which an indicator indicating a remaining budget of 0 and/or the change of state may be present.

Figure 3F:
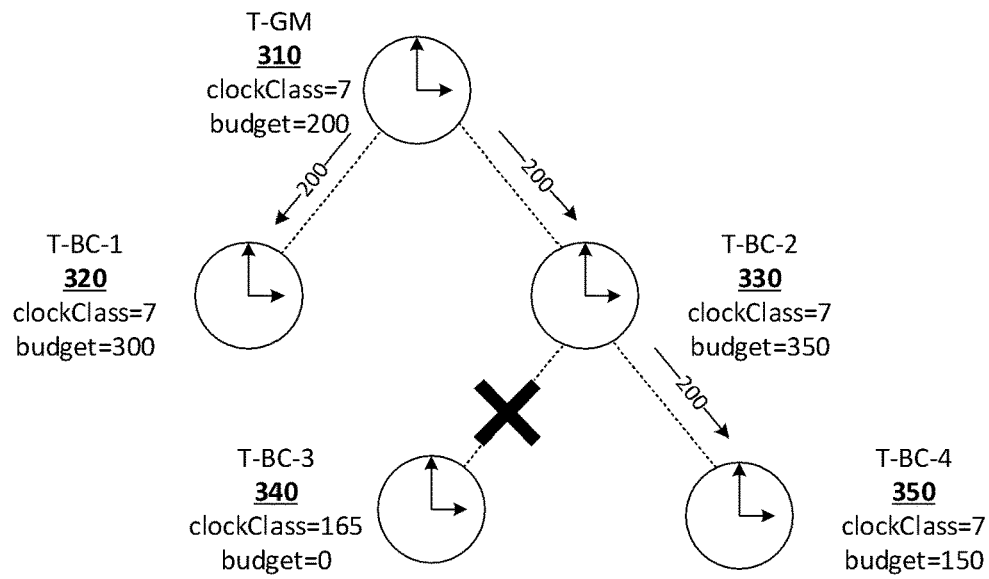

Referring to FIG. 3F, after a further time period of 50 ns, the T-BC-2 330 may resume its time synchronization with its master node T-GM 310, and therefore it receives the announce message with the HoldoverBudget of 200 ns transmitted from the T-GM 310. In such a case, the T-BC-2 330 may change its clockClass from 165 back to 7 and its state from the "Holdover-Out-Of-Specification" state to the "locked" state. Further, since the T-BC-4 350 is always locked to the T-BC-2 330, the T-BC-4 350 may be triggered, by an announce message from the T-GM 310 or the T-BC-2 330, to change its clockClass from 165 back to 7 also. Further, the T-BC-2 330 and the T-BC-4 350 may restore their current holdover budgets to their initial holdover budgets of 350 ns and 150 ns, respectively.

Figure 3G:
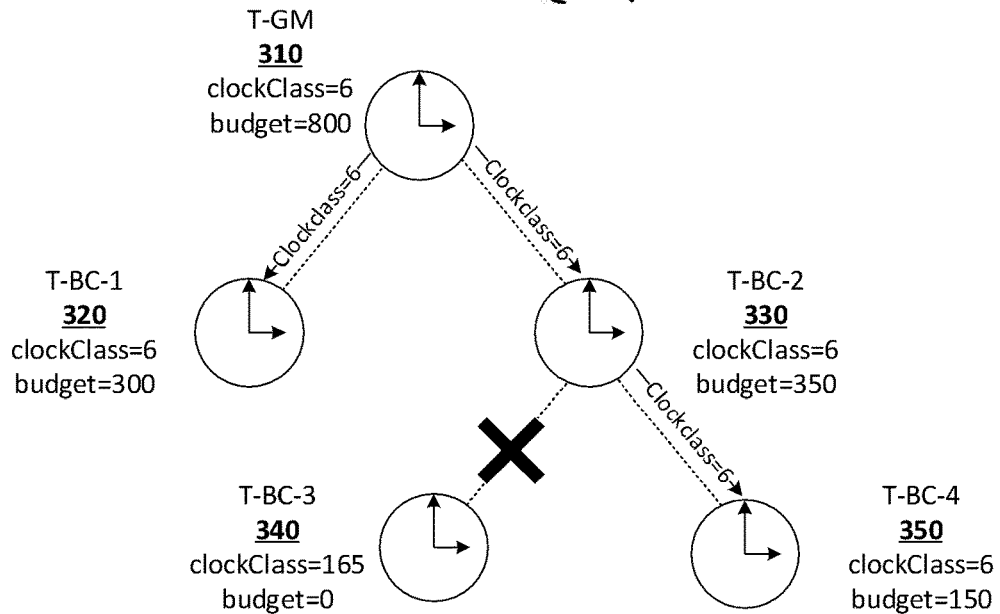

Referring to FIG. 3G, after a yet further time period of 50 ns, the T-GM 310 may resume its time synchronization with its master node PRTS 390, and therefore it may change its clockClass from 7 back to 6 and its state from the "Holdover-In-Specification" state to the "locked" state. Further, the T-GM 310 may transmit an announce message to its currently synchronized slave TS nodes to inform them of the changing of the state, and these slave TS nodes may update their clockClass as well and restore their own budgets to the initial values. In some embodiments, these slave TS nodes may purge all the stored budget received from their master nodes.

In this embodiment, it is clear that each TS node may continue to operate normally before its own holdover budget is exhausted and therefore extend its holdover time. By contrast, in the embodiment shown in FIG. 2C, a TS node has to abort its normal operation even if its performance is still acceptable when it loses time synchronization with its master TS node which is in the Holdover-In-Specification state.

Please note that the specific values (e.g., 800 ns, 300 ns, 350 ns, 6, 7, 135, 165, etc.), variables (e.g., clockClass, HoldoverBudget, etc.), messages (e.g. announce messages) are merely examples to explain the principle of the present disclosure, and the present disclosure is not limited thereto. In fact, in some other embodiments, different values, variables, messages, or any combinations thereof may be used. For example, in some other embodiments, the clockClass at the nodes may have a different definition than those described above, or different values of initial budgets may be assigned to the TS nodes. Further, in some other embodiments, a different message or a different field of the message may be used to indicate the holdover budget or any information from which the holdover budget may be derived. Further, in some embodiments, the variable "clockClass" may be omitted since the variable "HoldoverBudget" per se may implicitly indicate whether a node is in the Holdover-In-Specification state or the Holdover-Out-Of-Specification state, for example, by determining whether the HoldoverBudget is greater than zero or not.

Next, another embodiment in which multiple regions are involved will be described in details with reference to FIG. 4A-FIG. 4F.

FIG. 4A-FIG. 4F are schematic diagrams illustrating a TS network 40 comprising multiple TS nodes according to yet another embodiment of the present disclosure.

Figure 4A:
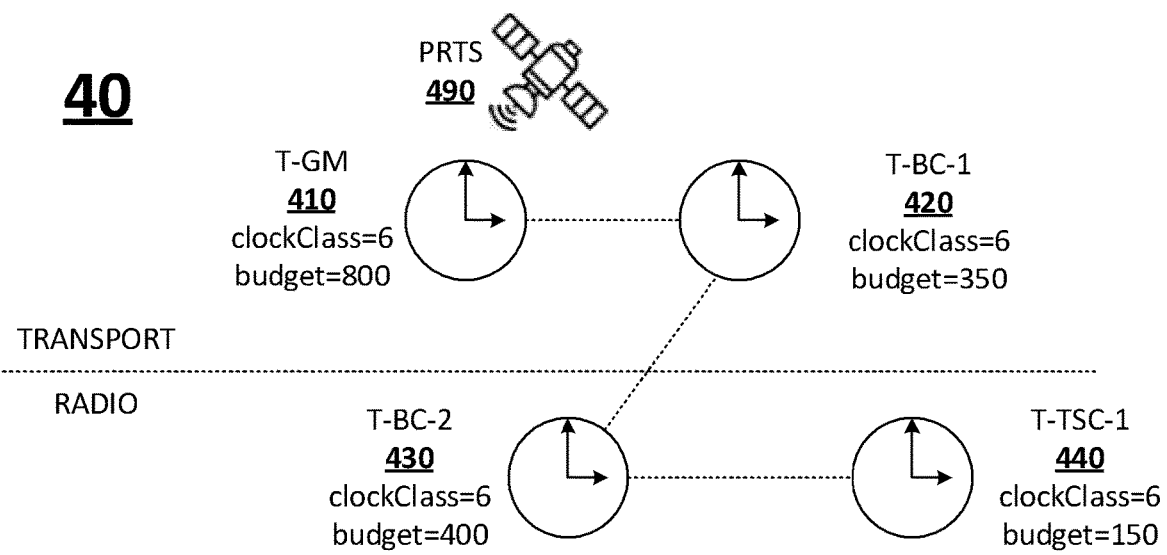
FIG. 4A-FIG. 4F are schematic diagrams illustrating yet another TS network comprising multiple TS nodes according to yet another embodiment of the present disclosure.

Referring to FIG. 4A, the TS network or domain 40 may comprise multiple TS nodes, such as, a grand master clock (e.g. T-GM 410), two boundary clocks (T-BC-1 420 and T-BC-2 430) and a slave-only ordinary clock (T-TSC-1 440), which are synchronized to each other. Further, there is also a primary reference time source (PRTS) 490 to which the T-GM 410 (and the whole TS network 40) is synchronized, and it typically does not belong to the TS domain 40 according to the definition of "domain" above.

As shown in FIG. 4A, there are two regions in the domain 40, one region comprising the T-GM 410 and the T-BC-1 420, and the other region comprising the T-BC-2 430 and the T-TSC-1 440. However, please note that the present disclosure is not limited thereto and there may be more regions in a domain.

Further, the master/slave ports are not shown in FIG. 4A-FIG. 4F for simplicity, and one skilled in the art may readily understand that a TS node may be a slave TS node synchronized to an upper or left master TS node which is connected by a dotted line therebetween, and a master TS node synchronized to a lower or right slave TS node which is connected by a dotted line therebetween. Further, the T-GM 410 is synchronized to the PRTS 490, which is the master TS node for the T-GM 410.

Please note that although FIG. 4A-FIG. 4F show only certain nodes and certain links between those nodes, the present disclosure is not limited thereto, and there may be additional nodes, less nodes, different nodes, and/or additional links, less links or different links therebetween. For example, a link may be present between T-BC-1 420 and T-TSC-1 440 though it is not shown in FIG. 4A-FIG. 4F. For another example, an additional node such as a transparent clock T-TC may be present between the T-GM 410 and the T-BC-1 420.

Referring back to FIG. 4A, the TS domain 40 is operated in a locked state. In other words, each node of the TS domain 40 is synchronized or locked to its master node, and ultimately to the grand master node T-GM 410, which is synchronized or locked to its master node PRTS 490, which could be a GPS satellite in the embodiment shown in FIG. 4A. Since all the nodes are locked to the T-GM 410 directly or indirectly, their clockClass will be identical to that of the grand master clock T-GM 410, which is 6 in the embodiment of FIG. 4A and according to the Table 3 above.

Further, each TS node in the domain 40 will be pre-configured or assigned an initial holdover budget, for example, based on their own hardware capabilities (e.g. clock accuracy, oscillator level). As shown in FIG. 4A, the T-GM 410, T-BC-1 420, T-BC-2 430, T-TSC-1 440 are pre-configured with holdover budgets of 800 ns, 350 ns, 400 ns, and 150 ns, respectively.

Figure 4B:
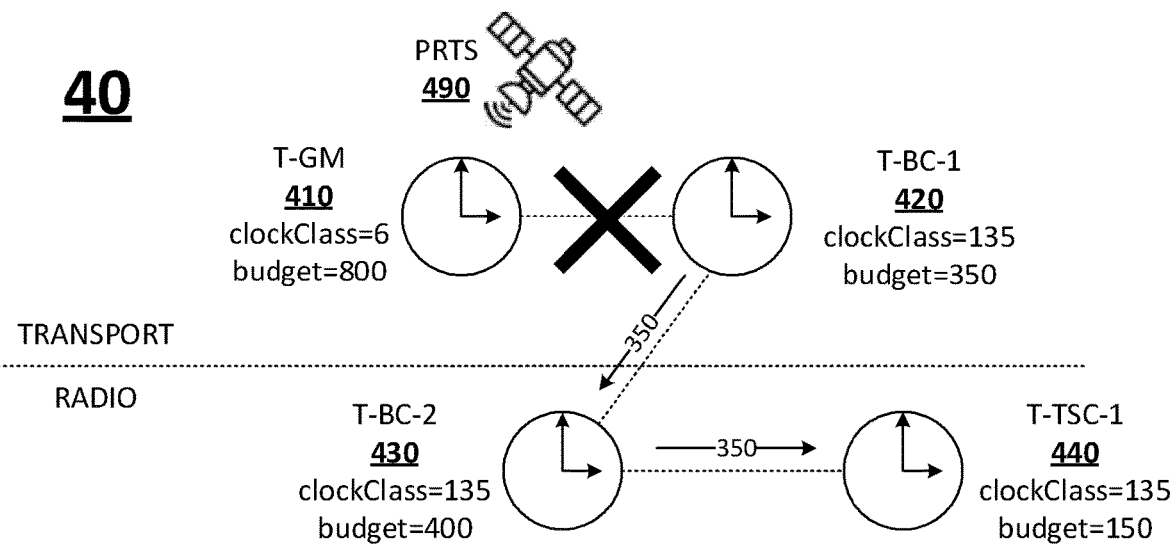

Referring to FIG. 4B, the T-BC-1 420 may lose its time synchronization with its master node the T-GM 410, and it changes its state from the "locked" state to the "Holdover-In-Specification" state by setting its clockClass to 135 and starting a holdover timer with its expiration time set as its initial holdover budget of 350 ns. Further, the T-BC-1 420 may transmit an announce message with the HoldoverBudget TLV to its slave TS nodes to inform them of the change of state and the remaining HoldoverBudget of 350 ns. Upon receiving the announce message with the holdover budget of 350 ns, each of the TS nodes, T-BC-2 430 and T-TSC-1 440, will change their own clockClass to 135, and store the received holdover budget of 350 ns for future use.

Figure 4C:
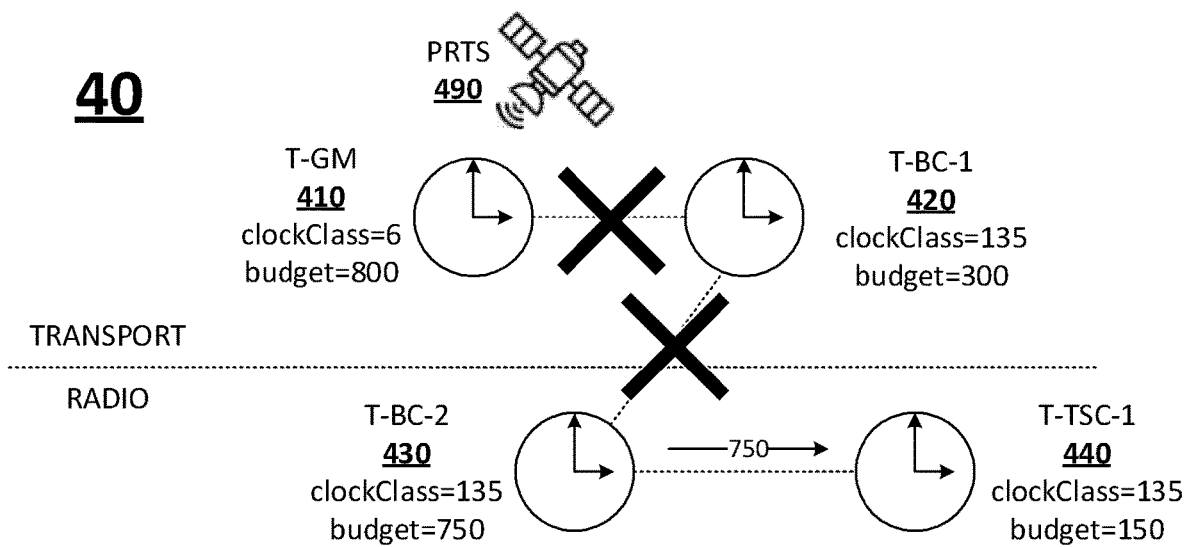

Referring to FIG. 4C, the T-BC-2 430 may detect loss of time synchronization with its master TS node, T-BC-1 420, and then it may first determine whether its master TS node was in the "Holdover-In-Specification" state or not, for example, by checking its own clockClass which is consistent with that of its master TS node. Since the clockClass at T-BC-2 430 was 135 which indicates a Holdover-In-Specification state of its master TS node, T-BC-1 420, the T-BC-2 430 may check whether the budget of 350 ns was received from a master TS node in a different region than itself, for example, by comparing the clock identity present in the received HoldoverBudget TLV with a pre-defined list of clock identifies within the same region as itself. In the embodiment of FIG. 4C, the T-BC-2 430 determines that the stored budget of 350 ns was received from T-BC-1 420 which is located in a different region (e.g., the transport region) than that of itself (e.g., the radio region), and therefore the T-BC-2 430 may calculate the sum of the received budget of 350 ns and its own pre-configured initial budget of 400 ns, i.e. 750 ns, as the expiration time for its own holdover timer to be started. Similar to T-BC-1 420 in FIG. 4B, T-BC-2 430 may transmit an announce message with a HoldoverBudget of 750 ns to inform its slave TS nodes of the remaining budget for the part of the TS domain 40, which comprises the T-TSC-1 440 only in addition to the T-BC-2 430 itself. Upon receiving the announce message from T-BC-2 430, the T-TSC-1 440 may update its stored budgets of 350 ns which was previously received as shown in FIG. 4B with the new budget of 750 ns as shown in FIG. 4C.

Figure 4D:
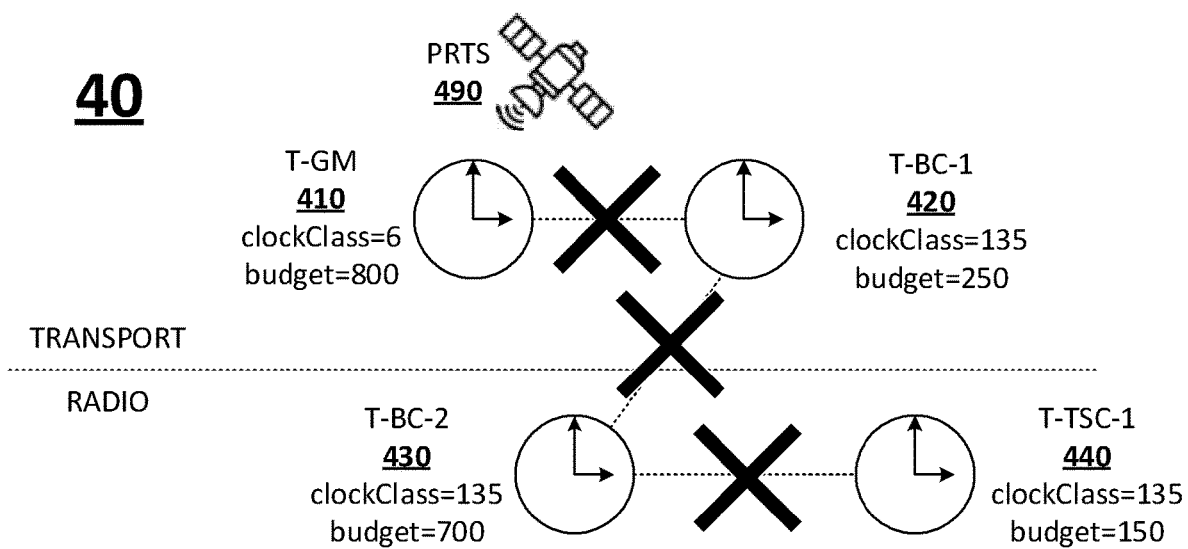

Referring to FIG. 4D, the T-TSC-1 440 may detect loss of time synchronization with its master TS node, T-BC-2 430, and then it may first determine whether its master TS node was in the "Holdover-In-Specification" state or not, for example, by checking its own clockClass which is consistent with that of its master TS node. Since the clockClass at T-TSC-1 440 was 135 which indicates a Holdover-In-Specification state of its master TS node, T-BC-2 430, the T-TSC-1 440 may check whether the budget of 750 ns was received from a master TS node in a different region than itself. In the embodiment of FIG. 4D, the T-TSC-1 440 determines that the stored budget of 750 ns was received from T-BC-2 430 which is located in a same region (e.g., the radio region) as that of itself, and therefore the T-TSC-1 440 may use the minimum of the received budget of 750 ns and its own pre-configured initial budget of 150 ns, i.e. 150 ns, as the expiration time for its own holdover timer to be started.

Figure 4E:
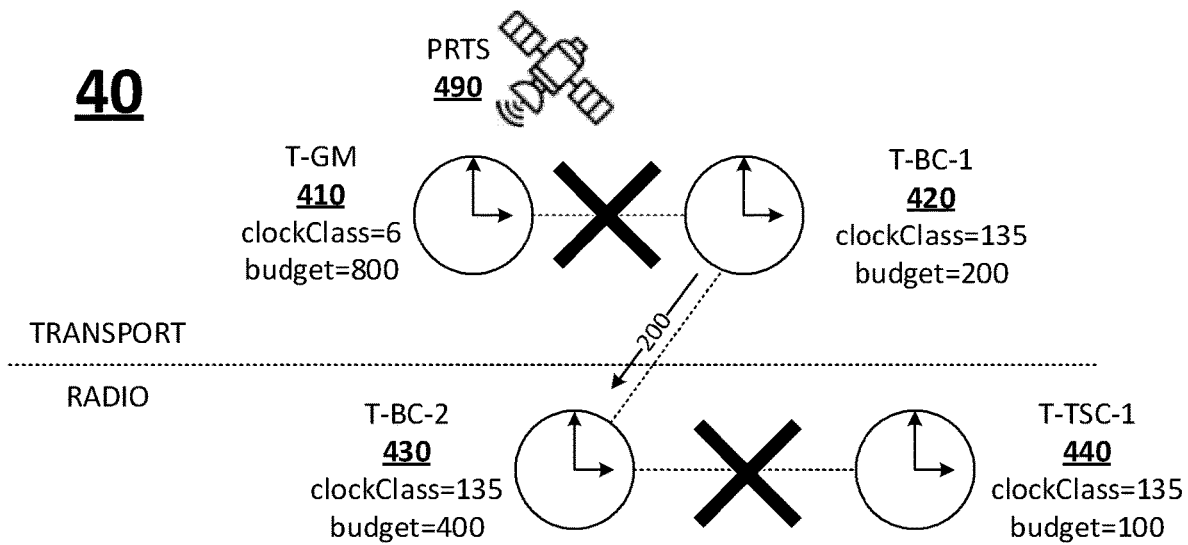

Referring to FIG. 4E, after a time period of 50 ns, the T-BC-2 430 may resume its time synchronization with its master node T-BC-1 420, and therefore it receives the announce message with the HoldoverBudget of 200 ns transmitted from the T-BC-1 420. In such a case, the T-BC-2 430 may be synchronized or locked to the T-BC-1 420 and may restore its current holdover budget to its initial holdover budgets of 400 ns and update its saved holdover budget with 200 ns.

Figure 4F:
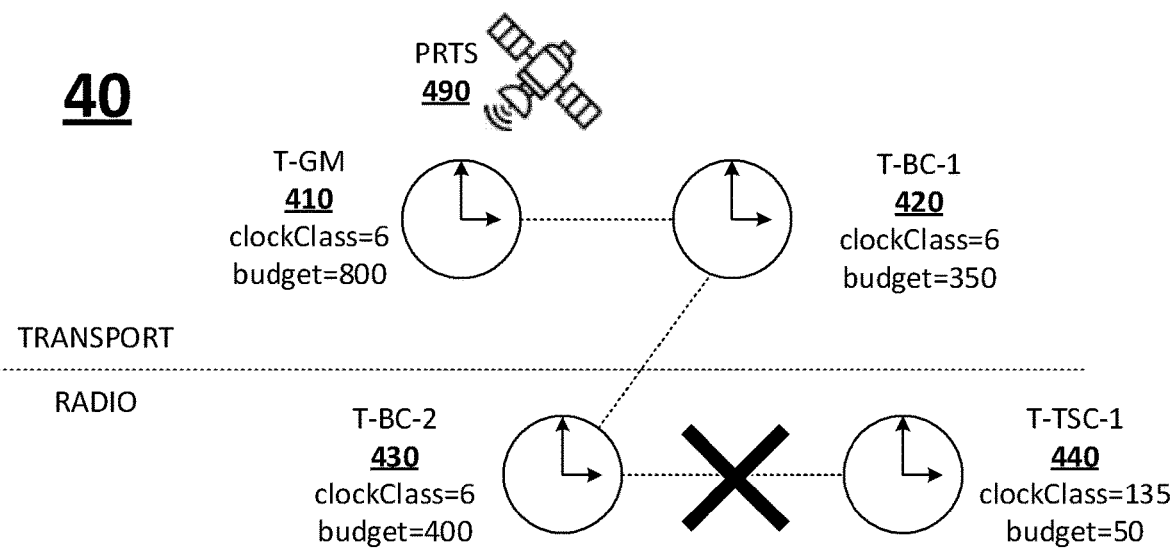

Referring to FIG. 4F, after another time interval of 50 ns, the T-BC-1 420 may resume its time synchronization with its master node T-GM 410, and therefore it may change its clockClass from 135 back to 6 and its state from the "Holdover-In-Specification" state to the "locked" state. Further, the T-BC-1 420 may transmit an announce message to its currently synchronized slave TS nodes to inform them of the changing of the state, and these slave TS nodes may update their clockClass as well and restore their own budgets to the initial values. In some embodiments, these slave TS nodes may purge all the stored budget received from their master nodes.

Similar to the embodiment shown in FIG. 3A-FIG. 3G, in the embodiment shown in FIG. 4A-FIG. 4F, each TS node may continue to operate normally before its own holdover budget is exhausted and therefore extend its holdover time. Even further, a TS node in a region may exploit the remaining budget of another TS node in another region, thereby further extending its holdover time. In fact, as shown in FIG. 4A-FIG. 4F, a user may never notice that there was a loss of time synchronization since the TS nodes may recover from the link failure before running out of their holdover time.

Figure 5:
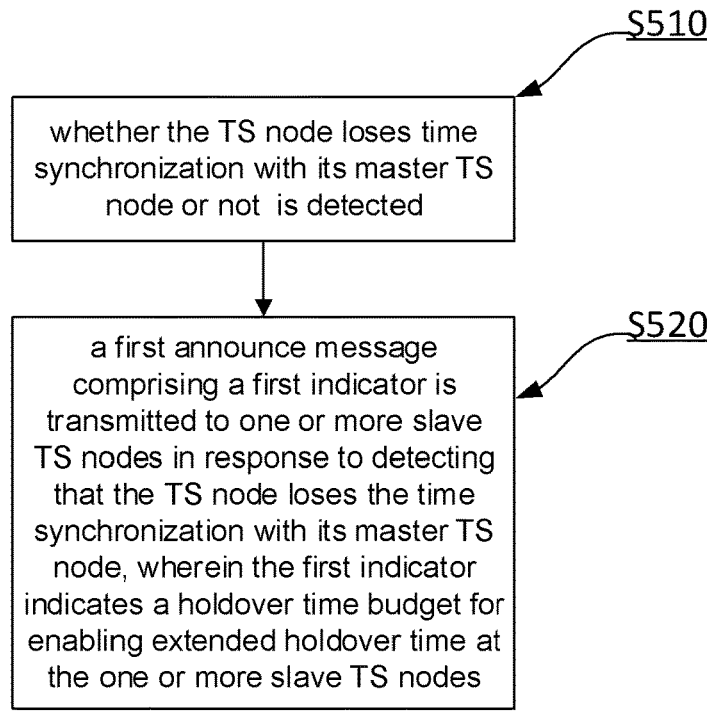
FIG. 5 is a flow chart of an exemplary method for enabling extended holdover time according to an embodiment of the present disclosure.

FIG. 5 is a flow chart of an exemplary method 500 for enabling extended holdover time according to an embodiment of the present disclosure. The method 500 may be performed at a TS node (e.g., the TS nodes shown in FIG. 3A-FIG. 3G, or the TS nodes shown in FIG. 4A-FIG. 4F, or the device 600 shown in FIG. 6) for enabling extended holdover time. The method 500 may comprise step S510 and Step S520. However, the present disclosure is not limited thereto. In some other embodiments, the method 500 may comprise more steps, less steps, different steps or any combination therefore. Further the steps of the method 500 may be performed in a different order than that described herein. Further, in some embodiments, a step in the method 500 may be split into multiple sub-steps and performed by different entities, and/or multiple steps in the method 500 may be combined into a single step.

The method 500 may begin at step S510 where whether the TS node loses time synchronization with its master TS node or not is detected. At step S520, a first announce message (e.g. a PTP ANNOUNCE message) comprising a first indicator (e.g. a HoldoverBudget TLV) may be transmitted to one or more slave TS nodes in response to detecting that the TS node loses the time synchronization with its master TS node, wherein the first indicator indicates a holdover time budget for enabling extended holdover time at the one or more slave TS nodes.

In some embodiments, after an initial transmission of the first announce message, one or more further transmissions of the first announce message may occur periodically with a value of the holdover time budget comprised in the first announce message being gradually reduced as the time elapses. In some embodiments, the method 500 may further comprise: entering into a "Holdover-In-Specification" state upon detecting that the TS node loses the time synchronization with its master TS node. In some embodiments, the first announce message may further comprise a second indicator (e.g., grandmasterClockQuality field in the PTP ANNOUNCE message) indicating that the TS node enters into the "Holdover-In-Specification" state. In some embodiments, the first indicator may indicate an initial holdover time budget which is pre-configured at the TS node. In some embodiments, upon detecting that the TS node loses the time synchronization with its master TS node, the method 500 may further comprise: starting a holdover timer with its expiration time set as the initial holdover time budget.

In some embodiments, before detecting that the TS node loses the time synchronization with its master TS node, the method 500 may further comprise: receiving a second announce message which comprises a third indicator, the third indicator indicating a holdover time budget of the master TS node when the second announce message was transmitted; and storing the holdover time budget of the master TS node. In some embodiments, the first indicator may indicate the minimum of an initial holdover time budget which is pre-configured at the TS node and the stored holdover time budget of the master TS node if the master TS node belongs to a same TS region as that of the TS node. In some embodiments, upon detecting that the TS node loses the time synchronization with its master TS node, the method 500 may further comprise: starting a holdover timer with its expiration time set as the minimum of the initial holdover time budget which is pre-configured at the TS node and the stored holdover time budget of the master TS node.

In some embodiments, the first indicator may indicate the sum of an initial holdover time budget which is pre-configured at the TS node and the stored holdover time budget of the master TS node if the master TS node belongs to a TS region other than that of the TS node. In some embodiments, upon detecting that the TS node loses the time synchronization with its master TS node, the method 500 may further comprise: starting a holdover timer with its expiration time set as the sum of the initial holdover time budget which is pre-configured at the TS node and the stored holdover time budget of the master TS node.

In some embodiments, the method 500 may further comprise: placing the TS node into a "Holdover-Out-Of-Specification" state upon the expiration of the holdover timer. In some embodiments, if multiple second announce messages are received from the master TS node, the step of storing the holdover time budget of the master TS node may comprise: overwriting the previously stored holdover time budget of the master TS node with the holdover time budget of the master TS node indicated in the last received second announce message.

In some embodiments, in response to detecting that time synchronization with the master TS node which is synchronized to a primary reference time source (PRTS) or in the "Holdover-In-Specification" state is restored, the method 500 may further comprise: placing the TS node into the "locked" state; stopping the holdover timer; and transmitting an announce message to the one or more slave TS nodes to inform the restoration of the time synchronization.

In some embodiments, in response to detecting that time synchronization with the master TS node which is synchronized to a primary reference time source (PRTS) is restored, the method further comprises: clearing the stored holdover time budget of the master TS node. In some embodiments, in response to detecting that time synchronization with the master TS node which is in the "Holdover-In-Specification" state is restored, the method further comprises: updating the holdover time budget of the master TS node when receiving the second announce message.

In some embodiments, each of the TS nodes may be an IEEE 1588 Precision Time Protocol (PTP)-compliant node. In some embodiments, each of the announce messages may be a PTP-compliant ANNOUNCE message.

Figure 6:
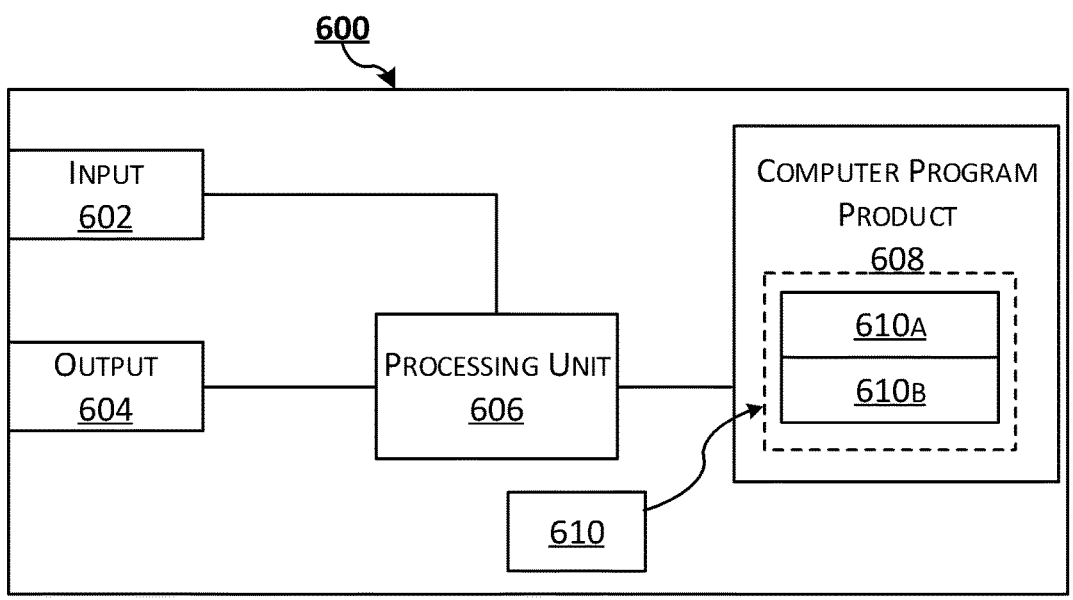
FIG. 6 schematically shows an embodiment of an arrangement which may be used in a TS node according to an embodiment of the present disclosure.

FIG. 6 schematically shows an embodiment of an arrangement 600 which may be used in a TS node according to an embodiment of the present disclosure. Comprised in the arrangement 600 are a processing unit 606, e.g., with a Digital Signal Processor (DSP) or a Central Processing Unit (CPU). The processing unit 606 may be a single unit or a plurality of units to perform different actions of procedures described herein. The arrangement 600 may also comprise an input unit 602 for receiving signals from other entities, and an output unit 604 for providing signal(s) to other entities. The input unit 602 and the output unit 604 may be arranged as an integrated entity or as separate entities.

Furthermore, the arrangement 600 may comprise at least one computer program product 608 in the form of a non-volatile or volatile memory, e.g., an Electrically Erasable Programmable Read-Only Memory (EEPROM), a flash memory and/or a hard drive. The computer program product 608 comprises a computer program 610, which comprises code/computer readable instructions, which when executed by the processing unit 606 in the arrangement 600 causes the arrangement 600 and/or the TS node in which it is comprised to perform the actions, e.g., of the procedure described earlier in conjunction with FIG. 2A-FIG. 2C, FIG. 3A-FIG. 3G, FIG. 4A-FIG. 4F, and FIG. 5 or any other variant.

The computer program 610 may be configured as a computer program code structured in computer program modules 610A-610B. Hence, in an exemplifying embodiment when the arrangement 600 is used in the TS node, the code in the computer program of the arrangement 600 includes: a detection module 610A for detecting whether the TS node loses time synchronization with its master TS node or not. The code in the computer program further includes a transmission module 610B for transmitting a first announce message comprising a first indicator to one or more slave TS nodes in response to detecting that the TS node loses the time synchronization with its master TS node, wherein the first indicator indicates a holdover time budget for enabling extended holdover time at the one or more slave TS nodes.

The computer program modules could essentially perform the actions of the flow illustrated in FIG. 2A-FIG. 2C, FIG. 3A-FIG. 3G, FIG. 4A-FIG. 4F, and FIG. 5, to emulate the TS node. In other words, when the different computer program modules are executed in the processing unit 606, they may correspond to different modules in the TS node.

Although the code means in the embodiments disclosed above in conjunction with FIG. 6 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method at a time synchronization (TS) node for enabling extended holdover time, the method comprising:
 detecting whether the TS node loses time synchronization with its master TS node or not;
 transmitting a first announce message comprising a first indicator to one or more slave TS nodes in response to detecting that the TS node loses the time synchronization with its master TS node, wherein the first indicator indicates a holdover time budget to be used while the TS is in a holdover state, for enabling extended holdover time at the one or more slave TS nodes; and
 after an initial transmission of the first announce message, one or more further transmissions of the first announce message occurring periodically with a value of the holdover time budget comprised in the first announce message being gradually reduced as the time elapses.

2. The method of claim 1, further comprising:
 entering into a "Holdover-In-Specification" state upon detecting that the TS node loses the time synchronization with its master TS node.

3. The method of claim 2, wherein the first announce message further comprises a second indicator indicating that the TS node enters into the "Holdover-In-Specification" state.

4. The method of claim 1, wherein the first indicator indicates an initial holdover time budget which is pre-configured at the TS node.

5. The method of claim 4, wherein upon detecting that the TS node loses the time synchronization with its master TS node, the method further comprises:

starting a holdover timer with its expiration time set as the initial holdover time budget.

6. The method of claim 5, further comprising:
placing the TS node into a "Holdover-Out-Of-Specification" state upon the expiration of the holdover timer.

7. The method of claim 5, wherein in response to detecting that time synchronization with the master TS node which is synchronized to a primary reference time source (PRTS) or in the "Holdover-In-Specification" state is restored, the method further comprises:
placing the TS node into the "locked" state;
stopping the holdover timer; and
transmitting an announce message to the one or more slave TS nodes to inform the restoration of the time synchronization.

8. The method of claim 7, wherein one or both of:
in response to detecting that time synchronization with the master TS node which is synchronized to a primary reference time source (PRTS) is restored, the method further comprises:
clearing the stored holdover time budget of the master TS node; and
in response to detecting that time synchronization with the master TS node which is in the "Holdover-In-Specification" state is restored, the method further comprises:
updating the holdover time budget of the master TS node when receiving the second announce message.

9. The method of claim 1, wherein before detecting that the TS node loses the time synchronization with its master TS node, the method further comprises:
receiving a second announce message which comprises a third indicator, the third indicator indicating a holdover time budget of the master TS node when the second announce message was transmitted; and
storing the holdover time budget of the master TS node.

10. The method of claim 9, wherein one or both of:
the first indicator indicates the minimum of an initial holdover time budget which is pre-configured at the TS node and the stored holdover time budget of the master TS node if the master TS node belongs to a same TS region as that of the TS node; and
the first indicator indicates the sum of an initial holdover time budget which is pre-configured at the TS node and the stored holdover time budget of the master TS node if the master TS node belongs to a TS region other than that of the TS node.

11. The method of claim 9, wherein one or both of:
upon detecting that the TS node loses the time synchronization with its master TS node, the method further comprises:
starting a holdover timer with its expiration time set as the minimum of the initial holdover time budget which is pre-configured at the TS node and the stored holdover time budget of the master TS node; and
wherein upon detecting that the TS node loses the time synchronization with its master TS node, the method further comprises:
starting a holdover timer with its expiration time set as the sum of the initial holdover time budget which is pre-configured at the TS node and the stored holdover time budget of the master TS node.

12. The method of claim 9, wherein if multiple second announce messages are received from the master TS node, the step of storing the holdover time budget of the master TS node comprises:
overwriting the previously stored holdover time budget of the master TS node with the holdover time budget of the master TS node indicated in the last received second announce message.

13. The method of claim 1, wherein each of the TS nodes is an IEEE 1588 Precision Time Protocol (PTP)-compliant node.

14. The method of claim 13, wherein each of the announce messages is a PTP-compliant ANNOUNCE message.

15. A time synchronization (TS) node, comprising:
a processor;
a memory storing instructions which, when executed by the processor, cause the processor to perform:
detecting whether the TS node loses time synchronization with its master TS node or not;
transmitting a first announce message comprising a first indicator to one or more slave TS nodes in response to detecting that the TS node loses the time synchronization with its master TS node, wherein the first indicator indicates a holdover time budget to be used while the TS is in a holdover state, for enabling extended holdover time at the one or more slave TS nodes; and
after an initial transmission of the first announce message, one or more further transmissions of the first announce message occurring periodically with a value of the holdover time budget comprised in the first announce message being gradually reduced as the time elapses.

* * * * *